(12) United States Patent
Jordan

(10) Patent No.: US 12,106,824 B2
(45) Date of Patent: Oct. 1, 2024

(54) POSITIONING SYSTEM WITH FLEXIBLE BAND AND ROLLERS

(71) Applicant: Physik Instrumente (PI) GmbH & Co. KG, Karlsruhe (DE)

(72) Inventor: Scott Jordan, Gilroy, CA (US)

(73) Assignee: Physik Instrumente (PI) GmbH & Co. KG, Karlsruhe (DE)

( * ) Notice: Subject to any disclaimer, the term of this patent is extended or adjusted under 35 U.S.C. 154(b) by 1090 days.

(21) Appl. No.: 16/954,653

(22) PCT Filed: Dec. 14, 2018

(86) PCT No.: PCT/IB2018/060132
§ 371 (c)(1),
(2) Date: Jun. 17, 2020

(87) PCT Pub. No.: WO2019/123184
PCT Pub. Date: Jun. 27, 2019

(65) Prior Publication Data
US 2020/0312424 A1    Oct. 1, 2020

Related U.S. Application Data

(60) Provisional application No. 62/599,955, filed on Dec. 18, 2017.

(51) Int. Cl.
*G12B 3/02* (2006.01)
*F16H 19/00* (2006.01)
(Continued)

(52) U.S. Cl.
CPC .............. *G12B 3/02* (2013.01); *F16H 19/003* (2013.01); *G12B 1/00* (2013.01); *G12B 3/00* (2013.01); *G12B 5/00* (2013.01); *H02P 7/025* (2016.02)

(58) Field of Classification Search
CPC .... F16H 19/003; F16H 19/005; F16H 19/006; F16H 2007/0891; F16H 2007/0893;
(Continued)

(56) References Cited

U.S. PATENT DOCUMENTS 3,452,175 A * 6/1969 Wilkes .................... G01P 15/08
200/16 R
3,730,007 A * 5/1973 Wellington ............. F16H 19/06
74/89.2
(Continued)

FOREIGN PATENT DOCUMENTS

CA  2178349 C  * 7/2007 .......... G01C 19/065
CN  103201200 A    7/2013
(Continued)

OTHER PUBLICATIONS

International Search Report and Written Opinion for Application No. PCT/IB2018/060132 dated Apr. 4, 2019 (13 pages).
(Continued)

*Primary Examiner* — Charles A Fox
*Assistant Examiner* — Gregory T Prather
(74) *Attorney, Agent, or Firm* — Michael Best & Friedrich LLP

(57) ABSTRACT

A positioning system includes a body, a flexible band disposed at least partially in the body, and a plurality of rollers in contact with the flexible band, wherein at least one of the rollers is constrained from translation both axially and radially.

19 Claims, 3 Drawing Sheets

(51) Int. Cl.
*G12B 1/00* (2006.01)
*G12B 3/00* (2006.01)
*G12B 5/00* (2006.01)
*H02P 7/025* (2016.01)

(58) Field of Classification Search
CPC ... G12B 1/00; G12B 3/00; G12B 3/02; H01H 35/148; H02P 7/025
See application file for complete search history.

(56) References Cited

U.S. PATENT DOCUMENTS

| | | | | |
|---|---|---|---|---|
| 4,264,270 | A | * | 4/1981 | Geary, Jr. ............... F03B 3/183 |
| | | | | 415/164 |
| 5,272,293 | A | | 12/1993 | Abbin et al. |
| 5,462,363 | A | | 10/1995 | Brinkman |
| 2004/0183777 | A1 | * | 9/2004 | Bevirt .................. G06F 3/05 |
| | | | | 345/156 |
| 2013/0274043 | A1 | * | 10/2013 | Hartmann ............. B60H 1/004 |
| | | | | 474/87 |
| 2018/0296291 | A1 | * | 10/2018 | Vokrot .................. B25J 13/025 |

FOREIGN PATENT DOCUMENTS

| | | |
|---|---|---|
| CN | 104870385 A | 8/2015 |
| DE | 4020148 A1 | 1/1992 |
| GB | 1181636 A | 2/1970 |
| GB | 1231046 A | 5/1971 |
| JP | S5652655 A | 5/1981 |
| JP | H05146932 A | 6/1993 |
| JP | 2000258572 A | 9/2000 |
| JP | 2003028974 A | 1/2003 |
| WO | 2012021059 A1 | 2/2012 |

OTHER PUBLICATIONS

Chinese Patent Office Action for Application No. 201880089618.6 dated Aug. 11, 2021 (28 pages including English translation).
Japanese Patent Office Action for Application No. 2020-552169 dated Apr. 4, 2022 (9 pages including English translation).
Japanese Patent Office Action for Application No. 2020-552169 dated Aug. 18, 2021 (15 pages including English translation).
European Patent Office Action for application 18839863.0 dated Jun. 1, 2022 (7 pages).
European Patent Office Action for Application No. 18839863.0 dated Apr. 25, 2024 (6 pages).

* cited by examiner

POSITIONING SYSTEM WITH FLEXIBLE BAND AND ROLLERS

CROSS-REFERENCE TO RELATED APPLICATIONS

This patent application is the U.S. national stage entry, under 35 U.S.C. § 371, of international application number PCT/IB2018/060132, filed Dec. 14, 2018, which claims priority to U.S. provisional application Ser. No. 62/599,955, filed Dec. 18, 2017, the entire contents of each of which are incorporated herein by reference.

FIELD OF THE INVENTION

The present disclosure relates to the field of positioning systems.

BACKGROUND

Positioning systems are often used to selectively move components, for example linearly. The positioning systems include sliding or rolling bearings and drive elements. One fundamental limiting factor in a positioning system's resolution capability is the difference between its static and sliding frictional coefficients. This difference results in a stiction behavior seen in conventional positioning systems with sliding or rolling bearings and drive elements.

SUMMARY

In accordance with one embodiment, a positioning system includes a body, a first roller disposed within the body, a second roller disposed within the body, and a band disposed within the body. The band includes a first end fixed to the body and a second end fixed to the body. The band is engaged with both the first roller and the second roller along portions of the first and second roller. The first and second rollers are both constrained axially and radially. An actuator or motor drives rotation of one or both rollers to generate linear movement of the body.

In accordance with another embodiment, a positioning system includes a body, a first roller disposed within the body, a second roller disposed within the body, a third roller disposed within the body, and a fourth roller disposed within the body. A band is engaged with each of the four rollers. At least two of the four rollers are constrained axially and radially. Driving one or more rollers rotationally confers linear motion to the body of the mechanism.

In accordance with another embodiment, a positioning system includes a body, a first roller disposed within the body, a second roller disposed within the body, a third roller disposed within the body, and a fourth roller disposed within the body. A first band is engaged with both the first and second rollers. A second band is engaged with both the third and fourth rollers. At least two of the four rollers are constrained axially and radially.

Other aspects of the disclosure will become apparent by consideration of the detailed description and accompanying drawings.

Before any embodiments of the disclosure are explained in detail, it is to be understood that the disclosure is not limited in its application to the details of embodiment and the arrangement of components set forth in the following description or illustrated in the following drawings. The disclosure is capable of supporting other embodiments and of being practiced or of being carried out in various ways. Also, it is to be understood that the phraseology and terminology used herein is for the purpose of description and should not be regarded as limited.

DETAILED DESCRIPTION

Figure 1:
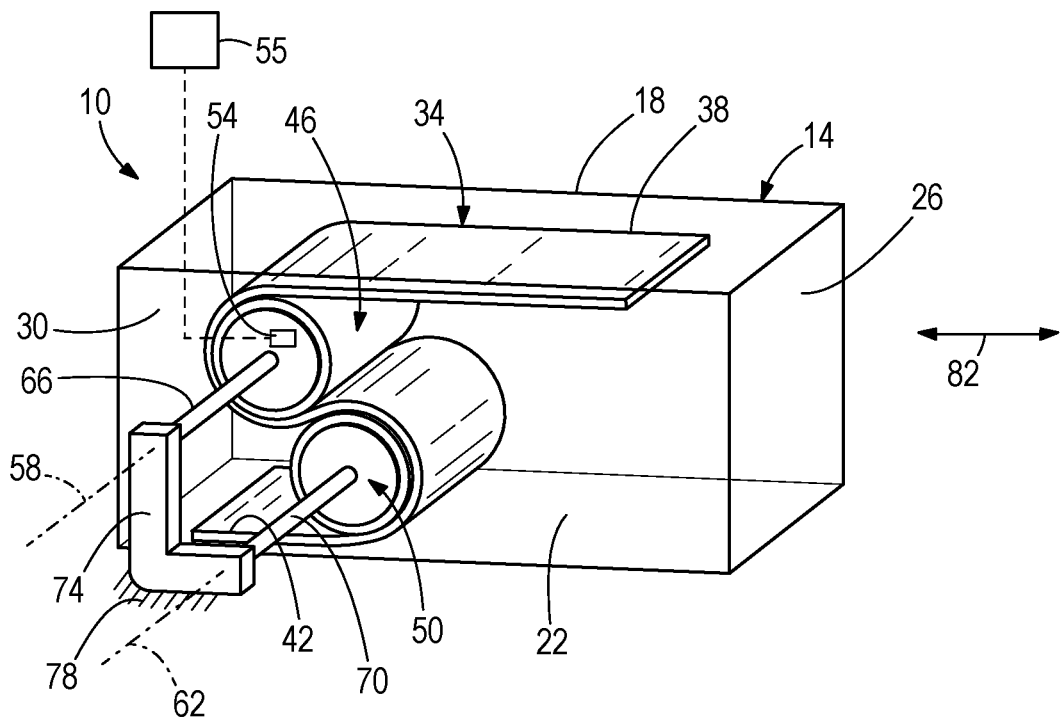
FIGS. 1 and 2 illustrate a positioning system according to one embodiment.
Figure 2:
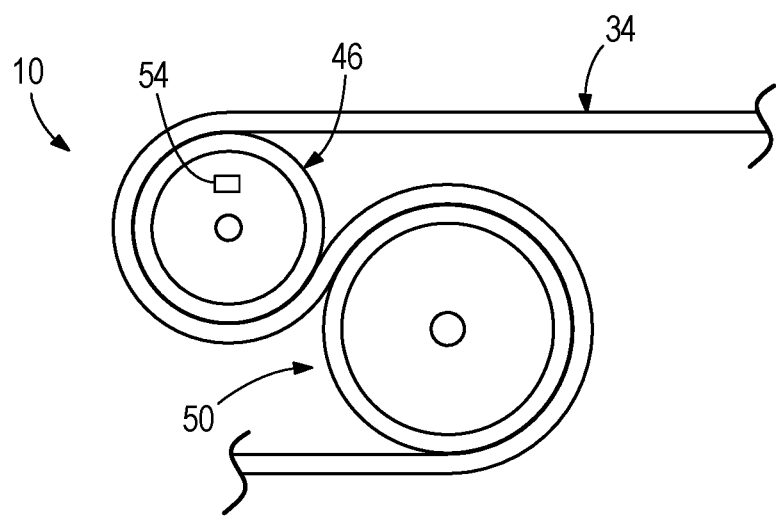

FIGS. 1 and 2 illustrate a positioning system 10. The positioning system 10 includes a body 14. In the illustrated embodiment the body 14 is a generally rectangular, hollow cage having a top wall 18, a bottom wall 22, a first side wall 26, and a second side wall 30. Other embodiments include different shapes, profiles, and numbers and arrangements of bodies and walls than that illustrated. The body 14 may be made of one or more of a variety of different types of materials, including but not limited to plastics, metals, etc.

The positioning system 10 also includes at least one flexible band 34 (e.g., tension band) disposed at least partially within the body 14. In the illustrated embodiment, the positioning system 10 includes a single band 34. The band 34 includes a first end 38 and a second, opposite end 42. The first end 38 is fixed (e.g., with at least one fastener, adhesive, etc.) to the body, such as by clamping to an inside surface of the top wall 18. The second end 42 is fixed (e.g., with at least one fastener, adhesive, etc.) to the body, such as by clamping to an inside surface of bottom wall 22. The band 34 may be made of variety of different types of materials, including but not limited to substantially inelastic but flexible materials. Tabs, slots and other features may be added to the band design, with some of these features clamped or otherwise attached to the body as described and the others attached to one or more rollers, thereby preventing side-to-side migration of the band. Optionally, the bands can contain, carry or be integrated with electrical traces (similar to a flex circuit board), plumbing or vacuum lines, or other facilities that need to be conveyed to mounted components on the body 14.

With continued reference to FIGS. 1 and 2, the positioning system 10 also includes at least one roller in contact with the band or bands 34. In the illustrated embodiment, the positioning system 10 includes a first roller 46 and a second roller 50. The first roller 46 is cylindrical, and is partially in contact with the band 34. The second roller 50 is also cylindrical and in contact with the band 34. As illustrated in FIG. 1, the first and second rollers 46, 50 are positioned within the body 14 such that the band 34 presses against and winds around the first and second rollers 46, 50 generally in an "S"-shaped profile. The roller pairs press against each other via the band with a force that is essentially proportional to the tension preload on the band. This forms a line contact along the length of the rollers which serves as one of the degrees of freedom of constraint on the motion of the body 14. In some embodiments the band 34 is made at least partially of beryllium copper, Kapton, or other materials. In some embodiments, the band 34 and/or rollers includes perforations, grooves and/or texturing to (e.g., facilitate reduction of pumping losses). In some embodiments, the band is attached to the body by clamp or adhesive, and a preloading spring or similar mechanism may be integrated into this assembly. Alternatively one or more rollers can be slightly split so as to provide a natural spring force that will tension the band(s) as desired.

The positioning system 10 also includes at least one actuator 54 that drives rotation of one or more of the rollers. In the illustrated embodiment, the positioning system 10 includes a single actuator 54 (illustrated schematically) that drives rotation of the first roller 46. The actuator 54 is nested at least partially (e.g., fully) within the first roller 46. In other embodiments, the actuator 54 is disposed entirely outside of the first roller 46, and is coupled to the first roller 46 with a drive arm or other structure. The actuator 54 may be any of a variety of different types of actuators, including but not limited to conventional motor types (e.g., DC servo, stepper, open or closed-loop, etc.), as well as rotary voice coils (e.g., with stictionless flex pivots or rotary flexures), piezomotors, pneumatic, bimetallic coil, shape memory alloy, etc.

With continued reference to FIGS. 1 and 2, in the illustrated embodiment the first roller 46 and the second roller 50 are both constrained from translating axially or radially. Thus, the only degrees of freedom for the first and second rollers 46, 50 are rotational degrees of freedom about rotational axes 58, 62, respectively, of the first and second rollers 46, 50. In the illustrated embodiment the axes 58, 62 are parallel. To prevent translation of the first and second rollers 46, 50, the positioning system 10 includes a first or arm or axle 66 (e.g., motor shaft) extending axially from the first roller 46, and a second arm or axle 70 (e.g., motor shaft) extending axially from the second roller 50. The first and second arms or axles 66, 70 are coupled to (e.g., fixed to) a support bracket 74, which itself is coupled to (e.g., fixed to) a stationary platform 78. Other embodiments include various other structures by which to axially and radially constrain the first and second rollers 46, 50 or their motors or axles. In some embodiments, both the first roller 46 and the second roller 50 are each coupled to their own separate actuator 54. For example, a second actuator 54 may be disposed in the second roller 50. In some embodiments the rollers 46, 50 are counter-rotating, and/or the rollers 46, 50 are both constrained from translating axially or radially.

With reference to FIGS. 1 and 2, in the illustrated embodiment the positioning system 10 operates as a linear actuator to move the body 14 linearly back and forth along an axis of travel 82. The axis of travel 82 is perpendicular to the axes of rotation 58, 62 of the first and second rollers 46, 50. The body 14 is overall constrained in five degrees of freedom, and permitted to move only linearly along the axis of travel 82.

During operation, the actuator 54 is actuated (e.g., manually or automatically via a controller). When activated, the actuator 54 causes the first roller 46 to rotate about its axis of rotation 58 (e.g., clockwise or counterclockwise). The band 34 is engaged with the first roller 46 (e.g., frictionally). Thus, rotation of the first roller 46 (i.e., the driven roller) forces movement of the band 34. Movement of the band 34 forces rotation of the second roller 50 if it is not also motorized or powered. As noted above, the first and second ends 38, 42 of the band 34 are fixed to the body 14. Thus, rotation of the first and second rollers 46, 50 forces the body 14 to translate linearly along the axis of travel 82. To force the body 14 to move in the opposite direction along the axis of travel 82, the actuator 54 is reversed.

In the illustrated embodiment, a maximum travel distance of the body 14 along the axis of travel 82 is provided by the following equation:

$$\text{Travel} = 2\pi r (\Delta \text{ angle }°)/360$$

where r=radius of the driven first roller 46 and
($\Delta$ angle °)=the rotational movement in degrees of the driven first roller 46

These also define the equations of design resolution for the mechanism.

The actuator 54 in the illustrated embodiment is a voice coil motor. Thus, with a first roller 46 having a radius r of 1.0 cm, and with a 30° voice coil angular range, and a 0.1 arc-sec angular resolution (~19 bit), the maximum travel distance of the body 14 is 5.0 mm (with a linear resolution of approximately 5 nm). In other embodiments, the positioning system 10 has a maximum travel distance of at least 1 mm, at least 2 mm, at least 3 mm, at least 4 mm, at least 5 mm, at least 6 mm, at least 7 mm, at least 8 mm, at least 9 mm, or at least 10 mm. Other embodiments include various other ranges and values. Additionally, and as noted above, in the illustrated embodiment, the positioning system 10 has a linear resolution of approximately 5 nm. In other embodiments, the linear resolution is less than 10 nm, less than 9 nm, less than 8 nm, less than 7 nm, less than 6 nm, or less than 5 nm. Other embodiments include various other values and ranges. In some embodiments, linear encoding is provided.

In the illustrated embodiment, both the first roller 46 and the second roller 50 have the same diameter. In other embodiments, the first roller 46 has a larger diameter than the second roller 50, or the second roller 50 has a larger diameter than the first roller 46. While the illustrated embodiment includes a single driven roller (i.e., the first roller 46), in other embodiments both the first roller 46 and the second roller 50 are driven by an actuator or actuators 54. For example, in in some embodiments the first roller 46 and the second roller 50 are separately driven in a counter-rotating manner by separate actuators 54. In some embodiments, a single actuator 54 drives rotation of both the first and second roller 46, 50 (e.g., via gears or chains).

Figure 3:
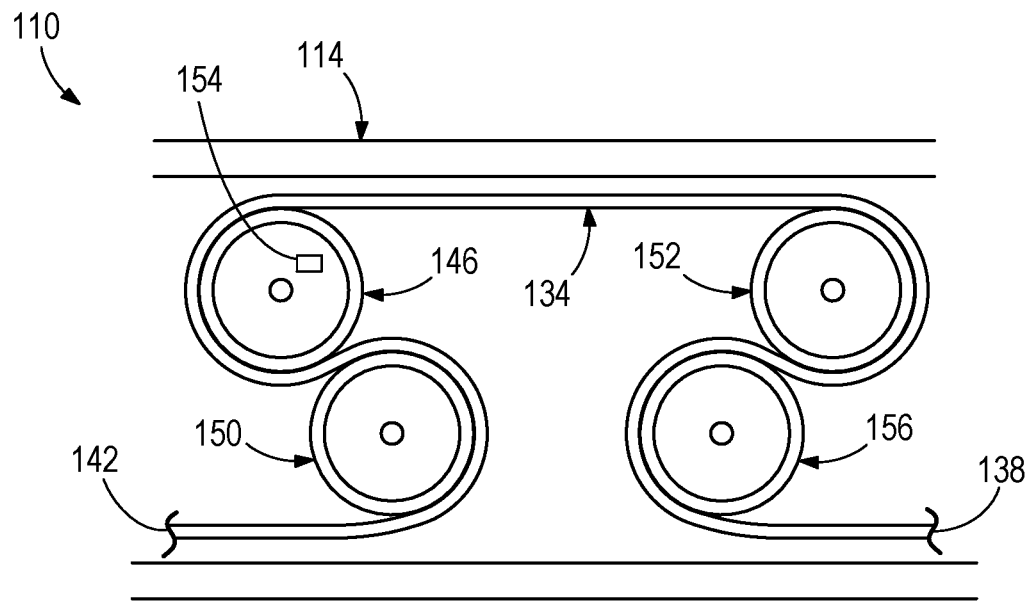
FIG. 3 illustrates a positioning system according to another embodiment.

With reference to FIG. 3, another positioning system 110 is illustrated. The positioning system 110 is similar to the positioning system 10 described above. Thus, like numbers are provided for like components, increased by 100. As illustrated in FIG. 3, the positioning system 110 includes not only a first roller 146 and a second roller 150, but also a third roller 152 and a fourth roller 156. The first, second, third, and fourth rollers 146, 150, 152, 156 each engage the same band 134, which is fixed at opposite first and second ends 138, 142 to a body 114. In the positioning system 110, at least two of the rollers are constrained both axially and radially, and at least one of the rollers is driven via an actuator 154. For example, in the illustrated embodiment the first roller 146 and the second roller 150 are both constrained axially and radially (similar to FIGS. 1 and 2), and the first roller 146 is driven by the actuator 154. In other embodiments the first roller 146, the second roller 150, and the third roller 152 are each constrained axially and radially. In some embodiments the first roller 146, the second roller 150, the third roller 152, and the fourth roller 156 are each constrained axially and radially. In this way, the motion of the body 14 is constrained in all degrees of freedom but the desired linear degree of freedom by axially and radially constraining at least two of the rollers in the assembly. In some embodiments the first roller 146 and the third roller 152 are each constrained axially and radially. Additionally, in the illustrated embodiment only the first roller 146 is driven via an actuator 154. In other embodiments multiple rollers are each driven with a separate (or chained, geared or otherwise coupled) actuator 154 (thus reducing the size and/or power required for each actuator 154). For example, in some embodiments both the first roller 146 and the second roller 150 are each driven via a separate actuator 154 (e.g. nested therein). In other embodiments both the first roller 146 and the third roller 152 are each driven via a separate actuator 154. For example, an actuator 154 may be disposed within the third roller 152, similar to the first roller 146. In yet other embodiments, a single actuator 154 drives two or more of the rollers (e.g., via gears or chains). Other embodiments include various other arrangements, including various other numbers of rollers and bands than that illustrated.

Figure 4:
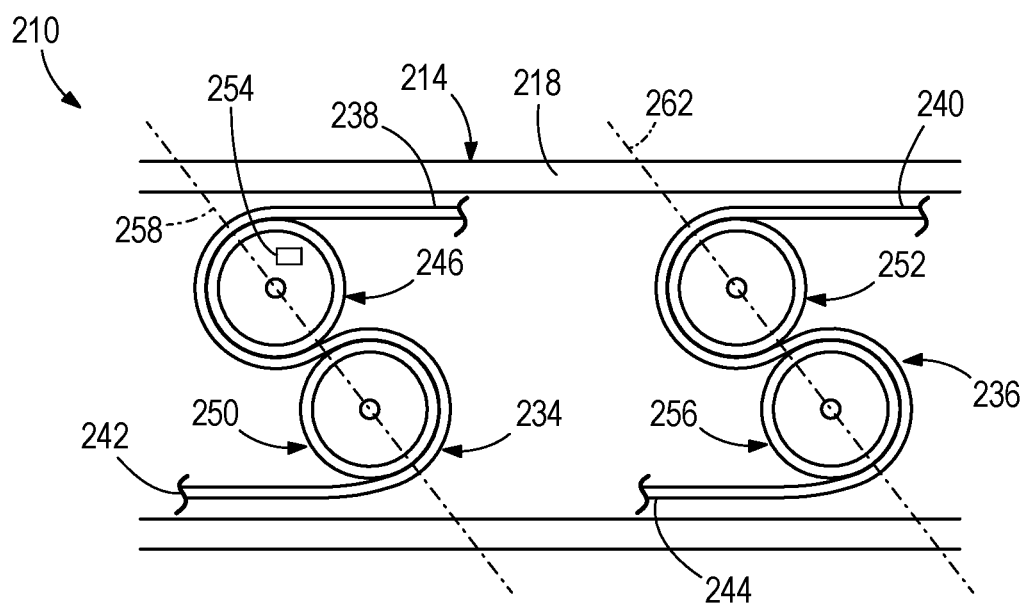
FIG. 4 illustrates a positioning system according to another embodiment.

With reference to FIG. 4, another positioning system 210 is illustrated. The positioning system 210 is similar to the positioning system 110 described above. Thus, like numbers are provided for like components, increased by 100. As illustrated in FIG. 4, the positioning system 210 includes a first roller 246, a second roller 250, a third roller 252, and a fourth roller 256. The first and second rollers 246, 250 each engage the same band 234, which is fixed at opposite first and second ends 238, 242 to a body 214. The positioning system 210 further includes a second band 236, having opposite first and second ends 240, 244 fixed to the body 214. The first and second bands 234, 236 are each smaller than the band 134. The third roller 252 and the fourth roller 256 each engage the second band 236. In the positioning system 210, at least two of the rollers are constrained both axially and radially, and at least one of the rollers is driven via an actuator 254. For example, in the illustrated embodiment the first roller 246 and the second roller 250 are both constrained axially and radially (similar to FIGS. 1-3). In other embodiments the first roller 246, the second roller 250, and the third roller 252 are each constrained axially and radially. In some embodiments the first roller 246, the second roller 250, the third roller 252, and the fourth roller 256 are each constrained axially and radially. In some embodiments the first roller 246 and the third roller 252 are each constrained axially and radially. Additionally, in the illustrated embodiment only the first roller 246 is driven via an actuator 254. In other embodiments, multiple rollers are each driven with a separate actuator 254 (thus reducing the size and/or power required for each actuator 254). For example, in some embodiments both the first roller 246 and the second roller 250 are each driven via a separate actuator 254. In other embodiments both the first roller 246 and the third roller 252 are each driven via a separate actuator 254 (e.g., nested therein). In yet other embodiments, a single actuator 254 drives two or more of the rollers (e.g., via gears or chains). Other embodiments include various other arrangements, including various other numbers of rollers and bands than that illustrated.

With continued reference to FIG. 4, the bands 234, 236 may be separate from one another, and the two pairs of rollers 246, 250 and 252, 256 are also separate from one another. Thus, an angle of repose of the first pair of rollers 246, 250 (defined as an angle between a line 258 that extends through both axes of rotation of the rollers 246, 250 and the flat top wall 218 in FIG. 4) may be different than an angle of repose of the second pair of rollers 252, 256 (defined as an angle between a line 262 that extends through both axes of rotation of the rollers 252, 256 and the flat top wall 218 in FIG. 4).

Figure 5:
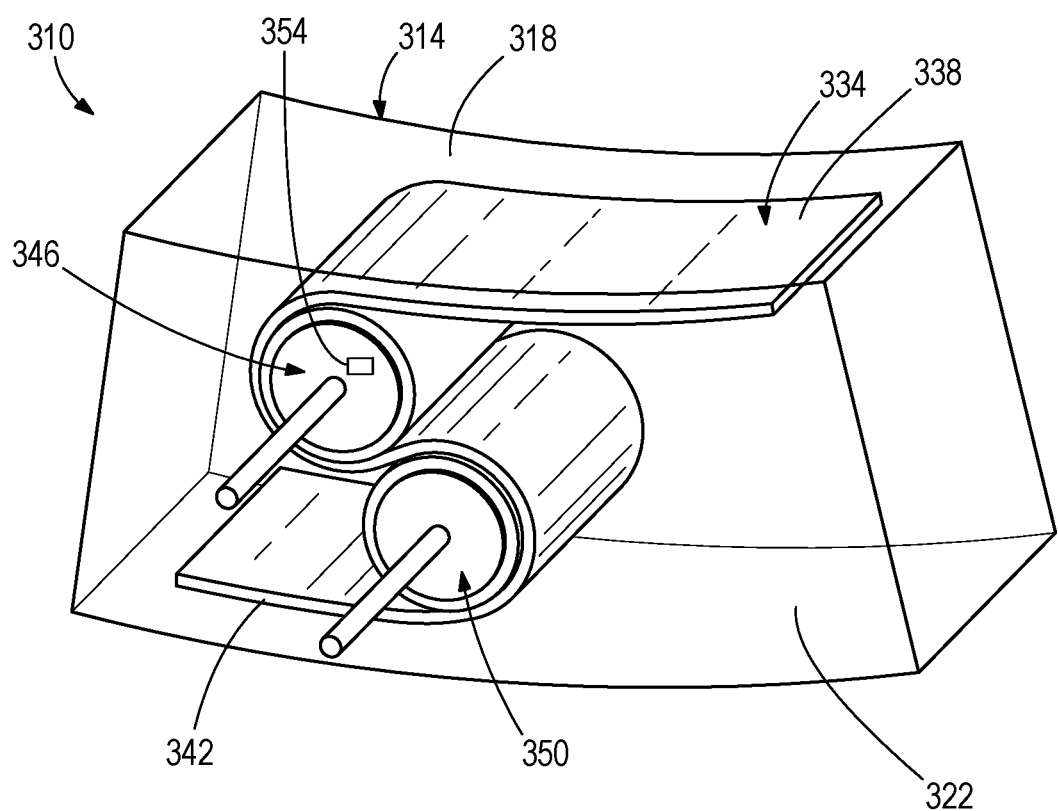
FIG. 5 illustrates a positioning system according to another embodiment.

FIG. 5 illustrates another positioning system 310. The positioning system 310 is similar to the positioning system 210 described above. Thus, like numbers are provided for like components, increased by 100. As illustrated in FIG. 5, the positioning system 310 includes a first roller 346 and a second roller 350. The first and second rollers 346, 350 are each engaged with a band 334 that is fixed at opposite ends 338, 342 to a body 314. In some embodiments the positioning system 310 includes additional rollers, and/or additional bands, similar to the positioning systems 110, 210. As illustrated in FIG. 5, the body 314 has an arcuate top wall 318 and an arcuate bottom wall 322. When the first roller 346 and/or second roller 350 are rotated via an actuator 354 (e.g., nested therein), the rotation of the first and second rollers 346, 350 causes the body 314 to move arcuately (as opposed to linearly). If the top and bottom walls 318 and 322 are parallel, the tension in the band will be constant. In this way, complex trajectory designs may be driven from simple rotational inputs. If the top and bottom walls 318 and 322 are not parallel (for example, have different radii of curvature) then the varying band preload that would otherwise accumulate over the system's travel may be readily accommodated by a spring preload mechanism or split roller as previously described.

If rollers of different size are each driven by actuators, one of the actuators may be devoted to high-speed actuation (generally, driving the larger diameter roller), while the other may be relegated to high-resolution actuation (generally, driving the smaller-diameter roller). Additionally, in some embodiments, a clutching device 55 (see for example FIG. 1) may be provided (e.g., inside or outside of the roller) to couple and decouple a rotational drive of one or more of the actuators described herein. For example, if one roller is driven by a rotary voice coil and the other is driven by a stepper motor for long travel, both may be alternately clutched and de-clutched to enable long travel/coarse motion and then fine actuation, perhaps over a more limited range.

The positioning systems 10, 110, 210, 310 described herein may be used in a variety of different applications and environments, including but not limited to coordinated measurement machines, disk drives, scanners, and/or stages used in vacuum environments. In some embodiments, the positioning systems 10 provide a lossless (or near lossless) rotary-linear conversion. For example, the positioning systems may be substantially "frictionless" systems having an approximately 1.0 order of magnitude (i.e., 10×) lower friction than ball bearings (other embodiments having other orders of magnitude including orders larger and smaller than 1.0), and require little to no lubrication (e.g., cause no degradation in repetitive small scanning motions), create little to no wear, have no precision parts, and/or have no precision preloads.

In some embodiments the positioning systems 10, 110, 210, 310 are suitable for high dynamic repetitive motions, are cost-effective, have long lifetimes, provide clean operation, are able to survive lengthy tracking/scanning operations, are highly dynamic, provide nanoscale resolution and repeatability, are stall-safe, have no moving cables, and/or provide long travel distances for the bodies 14, 114, 214, 314. In some embodiments, the positioning systems 10 are controllable to within a nanometer or nanometers, have little to no particulate generation, cause little to no migration of the bodies, are robust, are scalable and stackable, and are compact.

In some embodiments, the positioning systems 10, 110, 210, 310 described herein combine both guidance and actuation, and have air-bearing-class frictional characteristics. In some embodiments, the positioning systems inherit the virtually stictionless guidance of Rolamite technology, while adding virtually stictionless rotary-to-linear drive conversion. Consequently, the positioning systems 10, 110, 210, 310 uniquely provide for high resolution and high dynamics together with long travel, compact size and low manufacturing cost. Stiction, as noted above, is the difference between the static (breakaway) and sliding coefficients of friction. In the case of air bearings, this difference is zero or vanishingly close to zero. So, an air bearing requires very little force to begin moving or remain moving. The positioning systems 10, 110, 210, 310 also require very little force to begin moving. There may still be losses (e.g., aerodynamic or pumping losses). These losses, however may be mitigated by providing an easy path for the displaced air, such as by texturing the rollers or perforating the bands of the positioning systems 10, 110, 210, 310 described herein.

In some embodiments, the positioning systems also have a much lower mass than an equivalent air bearing (significant for high dynamics) and their speed capabilities are much higher. For example, a plastic prototype of a positioning system 10 with an inexpensive DC Servo motor was developed and tested. The prototype was capable of 7 m/sec velocities, which would overrun an air-bearing's air-cushion, limiting the air bearing's ability to translate at high speed without skidding and damage.

In some embodiments a potential travel range of the positioning system is much longer than that of any flexure, and unlike a flexure the positioning system may have no varying restoring force that can contribute to variable performance as a function of travel. In some embodiments the positioning system is also much more cost-effective to manufacture than a precision flexure and does not require the use of material optimized for repeated deformation. Accordingly, the positioning systems 10, 110, 210, 310 are ideal, versatile and enabling mechanisms for applications requiring high dynamics, high resolutions, and long travels.

Additionally, in some embodiments piezo-class (nanometer- or sub-nanometer-scale) resolution and repeatability are achievable when the positioning systems 10, 110, 210, 310, are actuated by a frictionless actuator and constraint such as a voice coil turning in a lossless rotational flexure. However, many other types of actuators can be used, including stepper motors, brushed and brushless DC servo motors, and rotary piezomotors. Depending on the application, multiple design variables may be taken into consideration, including cost, size, travel, resolution, and system dynamics by choice of actuator type and details such as brushed or brushless, micro stepping, axial guidance, magnetic versus piezomotor, hydraulic, pneumatic, and so on.

In some embodiments, one or more of the rollers 46, 50, 146, 150, 152, 156, 246, 250, 252, 256, 346, and/or 350 described herein are cylindrical rollers that offer packaging advantages. For example, because the motor/roller may not translate, it may be inset within the roller for compactness. Two counter-rotating actuators may be deployed in a pair of cylinders, or a plurality of actuators may be distributed among multiple roller pairs in a multi-roller configuration, such as might be desired for an especially long-travel mechanism.

In vertical applications it may be necessary to counterbalance the positioning systems 10, 110, 210, 310, for example to prevent them from falling in a power-off situation or to relieve the actuators from having to support the loads against gravity. There are a variety of conventional mechanisms such as airpots that may provide the necessary quasi-constant force for assemblies such as these. However, these elements generally add friction. Fortunately, the positioning systems 10, 210, 210, 310 described herein have a roller format that is suitable for integration of a clock-spring counterbalance. Clock-springs (also known as watch-springs or constant-force springs) may thus be integrated into one or more of the driven or un-driven rollers and may offer essentially frictionless, nearly constant-force performance. They are often inexpensively available on a commercial basis, and are reliable. A clock-spring's force may be adjusted to accommodate a specific load by winding or unwinding the set point of the spring. Roller rotations of several hundred degrees in either direction may thus see substantially constant rotational bias force, which the positioning systems 10, 110, 210, 310 naturally convert into linear force. In particular, for high resolution applications, this may be preferable to using a geared motor since the gears produce friction. Combining the watch-spring with one of the bands 34, 134, 234, 236, 334 described herein is also possible, reducing parts count.

In some embodiments, the positioning systems 10, 110, 210, 310 may be used in high resolution stage assemblies, high resolution actuators, high resolution parallel kinematic mechanisms such as tripods and hexapods, quasi-parallel kinematic stacked assemblies with strut-actuated loads, highly sensitive force generation, sensing and actuation, and/or with coarse/fine actuation.

With high resolution stage assemblies, the actuated body 14, 114, 214, 314 of the positioning system 10, 110, 210, 310 provides a mounting surface for stacking and for an actuated load. Multi-axis assemblies are readily assembled and can serve the same purposes as any conventional motion stage but without the costly and high-inertia spindle/nut assembly, bearings, couplings, thrust bearings and other conventional components, all of which contribute part costs and assembly costs. In addition, unconventional materials can be used besides the traditional machined metal, facilitating applications in challenging environments such as vacuum and caustic or explosive atmospheres.

With high resolution actuators, the actuated body 14, 114, 214, 314 pushes, pulls or supports the load. Nevertheless, predictable and repeatable guidance may be provided as an inherent capability of this mechanism. If the application requires especially high resolution, a frictionless actuator such as a voice-coil may be utilized, but good-quality motors may also be used (typically direct-drive to avoid geartrain friction).

With high resolution parallel-kinematic mechanisms such as tripods and hexapods, an array of actuators may support a workpiece in parallel. Again the combination of resolution, high dynamics and long travel may combine to enable such speed-hungry applications as photonics alignment and tracking, scanning metrology and active optics.

With quasi-parallel-kinematic stacked assemblies with strut-actuated loads, these mechanisms (such as PImiCos' "SpaceFab" configurations) typically utilize three conventional XY motorized stage stacks driven by a variety of possible motors. Substituting the positioning systems 10, 110, 210, 310 described herein for the motorized stages yields resolution, cost and dynamical advantages.

With highly sensitive force generation, sensing and actuation applications, since the friction and mass of the positioning system 10, 110, 210, 310 is so low, the force imparted by a probe mounted to a positioning system 10, 110, 210, 310 is essentially limited to the force generated by the actuator. For some actuators such as voice coils, this force can be exceedingly low, which is desirable in some ultra-resolution applications. In fact, in a simple closed-loop implementation with a high resolution linear position feedback element and P-I servo controller, the effective spring force of the mechanism (i.e., the assembly including the body, roller, bands, motors, etc.) is proportional to the P-term gain of the servo. Thus, for very low P-terms, the mechanism is very soft in the actuated direction but stiff in orthogonal directions. Thus the mechanism can be used as a high-resolution sensor and generator of force as well as position. Unlike flexure-based load cells (force detectors), the actuated travel is much larger and there is little or no position-dependent restoring force from the mechanism itself. These characteristics combine to enable many useful applications. For example, in coordinate measuring machines (CMMs)—a popular instrument for mapping object contours very precisely—a probe is actuated by precision stages until contact is observed; the positional feedback integrated into the CMM's stages can thus be utilized to map the surface of the object being probed. Strategies for accomplishing this include actuating into contact and observing the positional encoder for deflection signatures characteristic of contact, or actuating in constant-force or constant-current mode and observing the positional feedback. Basing such a mechanism on use of a positioning system 10, 110, 210, 310 described herein allows very fine detection of delicate surfaces, such as mapping the contours of micro- and macroscopic devices and features in semiconductor, photonic and biological applications as well as in industrial applications where microgram-level force detection is necessary along with submicron contour-map resolution.

With coarse/fine actuation, rollers 46, 50, 146, 150, 152, 156, 246, 250, 252, 256, 346, and/or 350 of different size may be driven, with the large roller conveying large travel and high speed, while the smaller roller provides especially high resolution. Different actuator types can be used for the rollers, and different actuator types can even be combined to drive any roller—for example a stepper motor for long travel combined with a voice coil for high-resolution fine actuation.

Though the positioning systems 10, 110, 210, 310 described above are in the context of rotary-to-linear conversion, the positioning systems 10, 110, 210, 310 may also be used for linear-to-rotary conversion. For example, with the rollers axially constrained so as to be held stationary, the body 14, 114, 214, 314 itself may be actuated rather than using a rotational actuator of some sort to rotate the cylindrical rollers. For example, a linear motor, linear piezomotor or linear solenoid or voice coil can actuate the body 14, 114, 214, 314. In this configuration, the linear actuation will be converted into a highly precise rotational motion of the rollers 46, 50, 146, 150, 152, 156, 246, 250, 252, 256, 346, and/or 350, again with the benefits of low mass, high dynamics and high resolution. A platform connected to the face of a roller would thus form a high-resolution rotational stage that can be used in place of a conventional motorized rotation stage or goniometer axis. Or it could rotationally actuate an actuator, for example to push and pull a load in an arc, or to form one axis of a rotationally-driven hexapod or other parallel-kinematic mechanism.

Although the disclosure has been described in detail with reference to certain preferred embodiments, variations and modifications exist within the scope and spirit of one or more independent aspects of the disclosure as described.

What is claimed is:

1. A positioning system comprising:
   a body;
   a flexible band disposed at least partially in the body;
   a plurality of rollers disposed in the body and in contact with the flexible band, wherein the plurality of roller includes a first roller and a second roller, wherein the first roller and the second roller are each constrained from translation both axially and radially;
   an actuator coupled to the first roller to drive rotation of the first roller and thereby move the body, wherein the actuator is fully disposed within the first roller;
   a first arm extending axially from the first roller; and
   a second arm extending axially from the second roller, wherein the first and second arms are fixed to a stationary platform, such that rotation of the first roller via the actuator is configured to move the body relative to the stationary platform.

2. The positioning system of claim 1, wherein the body is a hollow, rectangular cage having a top wall, a bottom wall, a first side wall, and a second side wall.

3. The positioning system of claim 2, wherein the flexible band is disposed entirely within the cage.

4. The positioning system of claim 1, wherein the flexible band includes a first end and a second, opposite end, wherein the first end is fixed to the body, and wherein the second end is fixed to the body.

5. The positioning system of claim 4, wherein the body is a hollow, rectangular cage having a top wall, a bottom wall, a first side wall, and a second side wall, wherein the first end of the flexible band is fixed to an inside surface of the top wall.

6. The positioning system of claim 5, wherein the second end of the flexible band is fixed to an inside surface of the bottom wall.

7. The positioning system of claim 1, wherein the band is pressed against and wound around the first and second rollers in a generally S-shaped profile.

8. The positioning system of claim 1, wherein the first roller and the second roller press against each other via the flexible band with a force that is proportional to a tension preload on the flexible band, thus forming a line contact along the first and second rollers.

9. The positioning system of claim 1, wherein the actuator is a rotary voice coil.

10. The positioning system of claim 1, wherein the actuator is a first actuator, wherein a second actuator is separately coupled to the second roller to drive rotation of the second roller.

11. The positioning system of claim 1, wherein the body is rectangular, such that when the actuator drives the first roller, the body moves linearly.

12. The positioning system of claim 1, wherein the body includes an arcuate top wall and an arcuate bottom wall, wherein the flexible band includes a first end fixed to the top wall and a second end fixed to the bottom wall, such that when the actuator drives the first roller, the body moves arcuately.

13. The positioning system of claim 1, wherein the plurality of rollers includes a third roller, and a fourth roller, wherein each of the first, second, third, and fourth rollers is in contact with the flexible band.

14. The positioning system of claim 1, wherein the flexible band is a first flexible band, wherein the plurality of rollers is a first plurality of rollers, wherein the positioning system includes a second plurality of rollers that includes a third roller and a fourth roller, wherein the first and second rollers are in contact with the first flexible band, wherein the positioning system further includes a second, separate flexible band, wherein the third and fourth rollers are in contact with the second flexible band.

15. The positioning system of claim 1, wherein the plurality of rollers includes a first pair of rollers and a second pair of rollers, wherein an angle of repose of the first pair of rollers is different than an angle of repose of the second pair of rollers.

16. The positioning system of claim 1, wherein a diameter of the first roller is different than a diameter of the second roller.

17. The positioning system of claim 1, wherein the actuator is coupled to a clutching device.

18. The positioning system of claim 1, wherein the body includes a flat top wall, wherein the plurality of rollers is a first plurality of rollers having a first pair of rollers and wherein the positioning system includes a second plurality of rollers having a second pair of rollers, wherein each of the first pair of rollers and the second pair of rollers is disposed below the flat top wall, wherein the first pair of rollers includes the first roller, which is configured to rotate about a first axis, and the second roller, which is configured to rotate about a second axis, wherein an angle of repose of the first pair of rollers is defined as an angle between a line, that extends perpendicularly through both the first axis and the second axis, and the flat top wall, wherein the second pair of rollers includes a third roller configured to rotate about a third axis and a fourth roller configured to rotate about a fourth axis, wherein an angle of repose of the second pair of rollers is defined as an angle between a line, that extends perpendicularly through both the third axis and the fourth axis, and the flat top wall, wherein the angle of repose of the first pair of rollers is different than the angle of repose of the second pair of rollers, wherein the flexible band is a first flexible band, and wherein the positioning system includes a second, separate flexible band coupled to the second pair of rollers.

19. A positioning system comprising:
a body;
a flexible band disposed at least partially in the body; and
a plurality of rollers disposed in the body and in contact with the flexible band, wherein the plurality of roller includes a first roller and a second roller, wherein the first roller and the second roller are each constrained from translation both axially and radially; and
an actuator coupled to the first roller to drive rotation of the first roller and thereby move the body, wherein the actuator is fully disposed within the first roller, wherein the actuator is a rotary voice coil.

* * * * *